Dec. 1, 1931.     H. E. WANER     1,834,559
TIRE BUILDING APPARATUS
Filed June 21, 1928     2 Sheets-Sheet 1

Inventor
Harry E. Waner
By Pierson, Eakin & Avery
Attys.

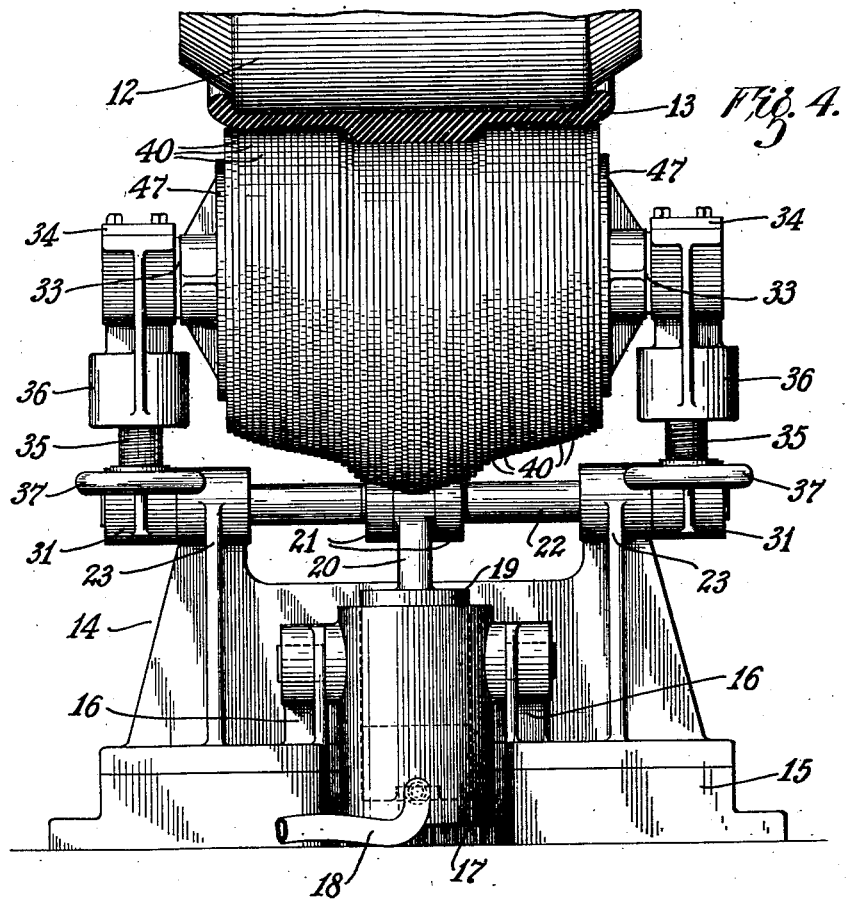
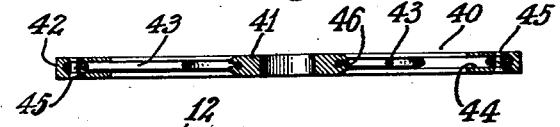
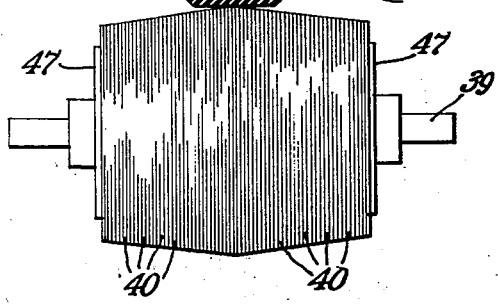

Patented Dec. 1, 1931

1,834,559

UNITED STATES PATENT OFFICE

HARRY E. WANER, OF AKRON, OHIO, ASSIGNOR TO THE B. F. GOODRICH COMPANY, OF NEW YORK, N. Y., A CORPORATION OF NEW YORK

TIRE-BUILDING APPARATUS

Application filed June 21, 1928. Serial No. 287,109.

This invention relates to tire-building apparatus, and especially to mechanism for rolling down or compacting the constituent elements of a tire during the manufacture thereof. The invention finds its primary utility in the manufacture of pneumatic tire casings of the pulley-band or drum-built type wherein it is especially useful for rolling down the heavy rubber tread slab of the tire and may be used also upon the carcass plies of rubberized fabric.

The foregoing operations heretofore have been performed, so far as I am aware, either manually with a small hand-tool, or mechanically by means of a cylindrical, power-actuated presser roll assembly comprising a plurality of relatively thin, laterally abutting, rotatable discs, each of which has a peripheral work-engaging portion which is yieldingly connected to its hub portion by a single, volute spring. The latter mechanism, while faster operating than the hand method, is objectionable because the presser roll engages the tire structure concurrently throughout a wide zone, with the result that air entrapped between the tire-plies is displaced circumferentially of the tire as the latter is rotated, and requires to be removed from the tire in a subsequent operation. This is especially true where the bead-portions of the flat tire-structure are of greater diameter than the adjacent side-wall portions, which is usually the case even with tires built on drums having sloping sides to accommodate said bead portions.

The general object of this invention is to provide improved apparatus for rolling down and compacting the plies of a tire structure and especially a tire band in substantially flat form. More specifically an object is to provide apparatus of the character described which will be adapted to press the tire structure by progression laterally thereof and thus to effect the removal of entrapped air transversely from between the tire-plies as the same are rolled down.

Of the accompanying drawings:

Fig. 3 is a diagrammatic elevation of my improved presser roll and the work at the begining of an operative cycle, the work being shown in section.

Fig. 4 is a side elevation of the tire-building apparatus as viewed from the right of Fig. 1, and the work, in section, engaged thereby.

Fig. 5 is a section on line 5—5 of Fig. 2.

Figure 1:
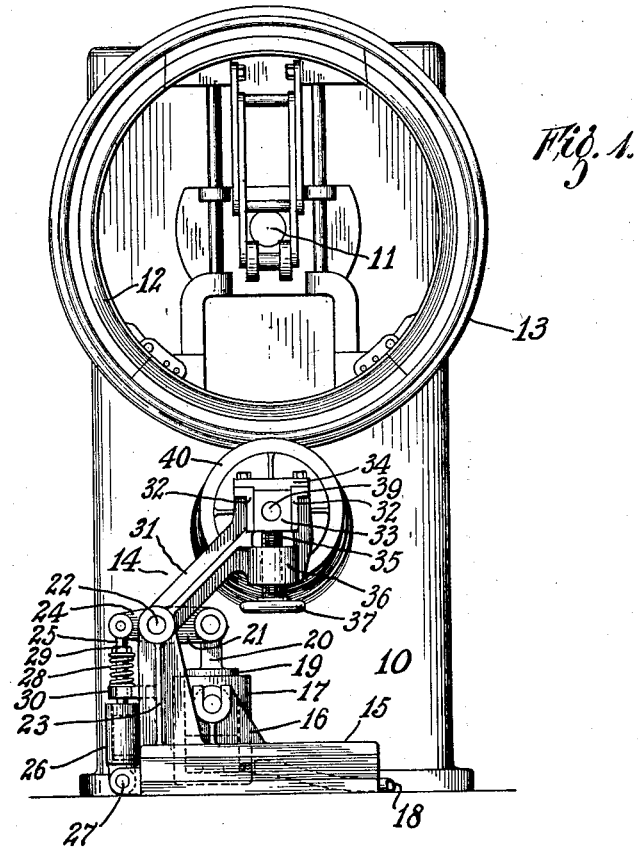
Fig. 1 is an elevation of a tire-building machine and my improved tire-building apparatus in operative association therewith.

My invention comprises a loosely journaled and highly elastic presser roller having a yielding surface which is crowned or tapered, preferably both ways from its middle, so that when it is brought slowly into engagement with a rotating article such as a flat band tire it will engage the same progressively from the middle of the tire's tread portion to its lateral margins or bead portions. Thus the plies of the tire are pressed and compacted to insure good adhesion therebetween, and concurrently any entrapped air within the tire structure is forced laterally and escapes at the margins of the plies.

Referring to the drawings, 10 is a tire-building machine from one side of which extends a rotatable spindle 11 on which is mounted a segmental, collapsible, tire-building drum 12 which may be of the "slope-shoulder" type, and 13 is a flat tire band built upon said drum. Mounted beneath the drum 12 in position to operate upon the tire casing 13 thereon is my improved apparatus for rolling down and compacting the tire-plies, said apparatus generally being designated 14.

The apparatus 14 comprises a base-casting 15 formed with a pair of upstanding journal-brackets 16, 16 in which is pivotally mounted a one-way fluid pressure cylinder 17 provided with a flexible supply and discharge pipe 18. The piston 19 of the fluid pressure cylinder 17 has its piston-rod 20 connected to one end of a rocker-arm 21 mounted upon a horizontal rock-shaft 22 which is journaled in brackets 23, 23 rising from the base-casting 15.

The rocker-arm 21 is formed with a rearward extension 24 which is connected to the upper end of the plunger-rod 25 of a dash-pot 26, the latter being pivotally secured at 27 to the base-casting 15. A compression spring 28 is mounted upon the plunger-rod 25 between a nut 29 thereon and the upper face of a slotted lug 30 extending rearwardly from the base-casting 15, the plunger-rod 25 extending through the slot in said lug.

The arrangement is such that admission of pressure fluid to the cylinder 17 raises its piston 19, to rock the shaft 22, at slow speed because of the resistance of the dash-pot 26. When the pressure fluid is exhausted from the cylinder 17 the spring 28 reverses the operation and restores the piston 19 to inoperative position.

Arms 31, 31 are mounted at adjacent ends thereof upon the respective end portions of the rock-shaft 22 outside its journal-brackets 23, and each arm has its free end formed with a guideway 32 for a slidable block 33, the upper end of said guideway being closed by a stop-plate 34. The bottom face of the slidable block 33 is engaged by a screw 35 which is threaded through a boss 36 formed on the arm 31, said screw being provided with a hand-wheel 37 for easy manipulation.

Supported from its ends by the slidable blocks 33 is a non-rotatable shaft or spindle 39 upon which are journaled a plurality of laterally-abutting discs 40, 40 of various outside diameters arranged in descending series each way from the middle of the shaft to produce, in effect, a crowned roll. By means of the screws 35 the blocks 33 may be suitably adjusted in their guideways to maintain the spindle 39 always parallel to the axis of the drum 12.

Figure 2:
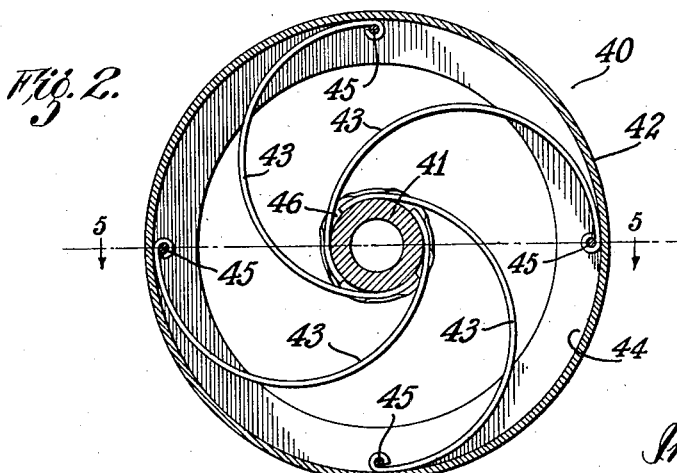
Fig. 2 is a vertical section through one of the presser elements.

As shown in Figs. 2 and 5, each disc 40 comprises a hub portion 41 and a normally concentric circumscribing ring-portion 42 which is spaced from said hub portion and yieldingly connected therewith by a plurality of volute springs 43, 43. The latter are narrower than the hub and ring portions of the disc, and have their outer end portions positioned within a groove 44 in the inner periphery of the ring and looped around respective rivets 45, 45 traversing said groove. The hub portion 41 of the disc is formed with a circumferential groove 46 in its outer periphery and the inner ends of the springs 43 are secured in said groove by the side-walls of the groove which are crimped upon the spring-ends.

The construction of the disc is such that the ring portion 42 can move radially with relation to the hub portion 41 while the entire structure rotates on the spindle 39. Thus collectively the discs provide a tapered roll structure having a yielding surface which may be deformed locally or throughout its length when forcibly brought into engagement with the rotating tire 13. The assembled discs bear lightly against each other so that there is but little friction as respective discs move relatively to each other, and end-plates 47, 47 are journaled on the spindle 39 at the end of the roll structure between the blocks 33 for holding the assembled discs in properly spaced relation and for preventing lateral movement of the ring portions of the discs with relation to their hub portions.

In the operation of the apparatus, the tire 13 is built upon the drum 12 in the usual manner. When it is desired to utilize the compacting apparatus, either upon the fabric carcass plies or upon the completely fabricated tire as shown, the operator causes the drum 12 to rotate and then admits pressure fluid to the cylinder 17 which lifts the arms 31 from their lowered inoperative position toward their position shown in Fig. 1, the movement being relatively slow because of the resistance provided by the dash-pot 26.

As shown in Fig. 3, the presser roll comprising the assembled discs first engages the tire band 13 at its middle, and as the arms 31 continue to rise, engage it progressively in each direction therefrom toward its lateral margins or bead portions until a complete transverse zone of the tire is under pressure as shown in Fig. 4. The rotation of the tire frictionally causes the discs 40 to rotate on the spindle 39 with the result that the tire is subjected to rolling pressure in a circumferential direction, which pressure is progressively applied to the tire concurrently in each direction from its middle. The different peripheral speeds of the discs incident to the different diameters of the several zones of the tire band and the different angular speeds of the discs incident to the different distances from their work contacting faces to their journal are permitted by their rotation with relation to each other upon their journal or spindle 39.

The apparatus effects a superior compacting of the tire-plies since any air entrapped between its plies is progressively forced laterally by the pressure applied progressively in a lateral direction, the air escaping at the margins of the plies even though the bead portions of the tire are of greater outside diameter than the intermediate portions of the tire as shown.

My invention is susceptible of modification and I do not wholly limit my claims to the specific construction shown.

I claim:

1. Tire-building apparatus comprising a support for a pneumatic-tire structure and, cooperatively associated therewith, a presser-roll device comprising a roll structure having a yielding surface and tapered toward each of its ends.

2. Tire-building apparatus comprising a support for a pneumatic-tire structure and, cooperatively associated therewith, a tapered presser-roll device having a yielding tire-engaging surface and comprising coaxial transverse sections.

3. Tire-building apparatus as defined in claim 2 in which the presser-roll device is tapered from its middle toward both ends.

4. Tire-building apparatus comprising a support for a pneumatic-tire structure and, cooperatively associated therewith, a presser-roll device comprising a plurality of coaxial, resilient-surfaced discs individually journaled upon a common spindle so as to admit of different angular speeds of the respective discs.

5. Tire-building apparatus as defined in claim 4 in which the discs are of various diameters and engage the tire-structure in progression by reason of the yielding character of their surfaces as the device is moved toward said tire-structure.

6. Tire-building apparatus comprising a support for a penumatic-tire structure and cooperatively associated therewith, a presser-roll device comprising a sectional roll-structure each section of which comprises a work-engaging ring resiliently mounted upon an axial hub which is journaled upon a non-rotatable spindle.

In witness whereof I have hereunto set my hand this 14th day of June, 1928.

HARRY E. WANER.